United States Patent [19]

Walter

[11] Patent Number: 4,708,309

[45] Date of Patent: Nov. 24, 1987

[54] SUPPORTING DEVICE HAVING INFINITELY ADJUSTABLE JIBS

[75] Inventor: Herbert Walter, Müllheim, Fed. Rep. of Germany

[73] Assignee: Protoned B.V., Amsterdam, Netherlands

[21] Appl. No.: 858,599

[22] Filed: May 1, 1986

[30] Foreign Application Priority Data

May 13, 1985 [CH] Switzerland ............... 2036/85

[51] Int. Cl.⁴ ............................... E04G 3/00
[52] U.S. Cl. ......................... 248/218.4; 248/295.1; 248/125; 403/49; 403/233
[58] Field of Search .............. 248/218.4, 295.1, 245, 248/125, 219.3, 219.4; 403/49, 230, 233, 234, 237, 367

[56] References Cited

U.S. PATENT DOCUMENTS

| | | | |
|---|---|---|---|
| 446,472 | 2/1891 | Roberts | 248/245 |
| 2,542,164 | 2/1951 | Tatro | 248/245 X |
| 2,854,293 | 9/1958 | Riblet | 248/218.4 X |
| 3,163,911 | 1/1965 | Kenney | 248/218.4 X |
| 3,437,060 | 4/1969 | Giambalvo | 248/218.4 X |
| 3,472,476 | 10/1969 | Johnson | 248/245 |
| 3,479,974 | 11/1969 | Ferdinand et al. | 248/245 X |
| 3,877,825 | 4/1975 | Roux | 403/233 |
| 4,167,255 | 9/1979 | Benson | 248/218.4 X |
| 4,278,224 | 7/1981 | Arakawa | 248/246 |
| 4,288,053 | 9/1981 | Sarkisian | 248/218.4 |

FOREIGN PATENT DOCUMENTS

| | | |
|---|---|---|
| 217177 | 9/1961 | Austria . |
| 733572 | 3/1943 | Fed. Rep. of Germany . |
| 2004220 | 9/1970 | Fed. Rep. of Germany . |
| 2120655 | 5/1972 | Fed. Rep. of Germany . |
| 2705149 | 8/1978 | Fed. Rep. of Germany ...... 403/237 |
| 2258545 | 8/1975 | France ................... 403/234 |

Primary Examiner—Cornelius J. Husar
Assistant Examiner—Todd G. Williams
Attorney, Agent, or Firm—Lahive & Cockfield

[57] ABSTRACT

The supporting device comprises a support column (1), on which a jib-wedge connecting device (2) can be attached in longitudinally displaceable manner and can be locked at any location of its longitudinal extension. The connecting device (2) with a clamping chuck (3), consisting of a supporting wall (3.1), receiving the jib arm (7), a tightening wedge cage (5) and a clamping plate (3.2) which connects these two components, grips around the support column (1) in the manner of a C-shaped engagement element. Frictional engagement is made between the connecting device (2) and the support column (1) by a tightening wedge (4) which is guided in longitudinally displaceable manner in the tightening wedge cage (5).

The clamping chuck (3) is provided with a lateral passage opening (9), through which the clamping chuck, by being placed laterally onto the support column (1), can be engaged with and disengaged from the latter.

4 Claims, 6 Drawing Figures

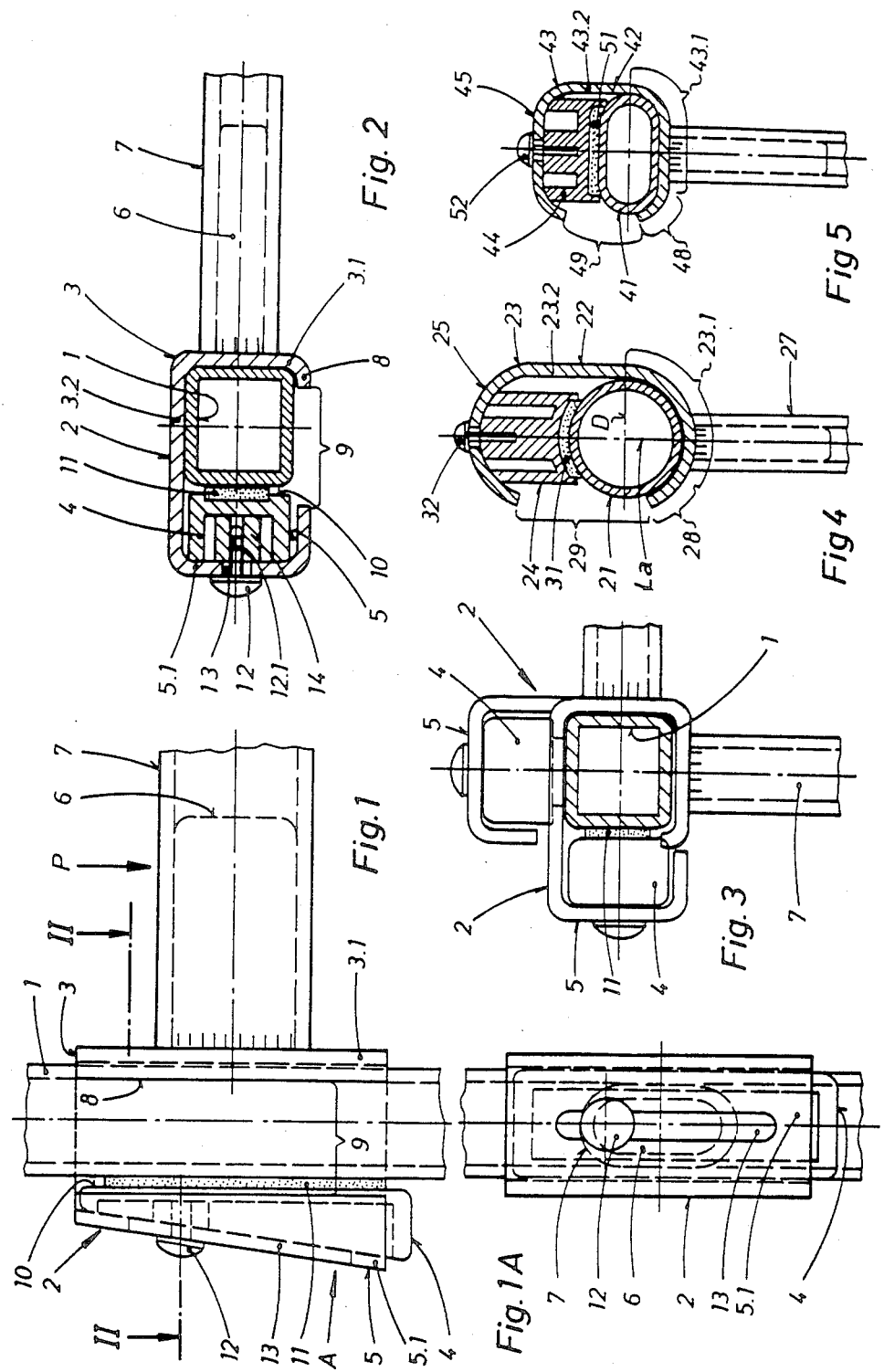

4,708,309

SUPPORTING DEVICE HAVING INFINITELY ADJUSTABLE JIBS

BACKGROUND OF THE INVENTION

The invention relates to a supporting device having infinitely adjustable jibs.

It is known to provide column supporting devices with jibs which are provided with hooks engaging in recesses or undercuts on the columns. Columns of this type accordingly have a structure which establish them as a support element for a predetermined type of jib-coupling device which as a rule can only be used in a specified structural module. Moreover, the recesses or undercuts have to be made over at least a considerable part of the column length and, for example in the case of polygonal sections, on several lateral surfaces, so that the column is formed for optimum applicability. The use of round or oval sections is virtually excluded. Although supporting devices of this type are very stable and can be formed to withstand high loads, a disadvantage results: the appearance of the columns suffers because of the structural elements, especially in display or sales areas, where as few technical details as possible should be visible.

SUMMARY OF THE INVENTION

The object of the invention is therefore to create a supporting device of the type mentioned at the outset in which jibs can be attached by simple clamped engagement and therefore in vertically and infinitely adjustable manner to both polygonal and round or oval section columns made of tubular or solid material. The configuration of the column or columns in a column assembly and the connecting device is to be such that the jib(s) can be placed on laterally and can be attached to a column in various mutual angular positions.

The achievement of this object is defined by patent claim 1. Embodiments thereof are established by the dependent claims.

The invention is explained below by way of example with reference to the drawing, in which:

BRIEF DESCRIPTION OF THE DRAWINGS

FIG. 1 shows an embodiment of the supporting device as viewed from the opening side of the jib-connecting device or from the rear, FIG. 1a shows the connecting device of the embodiment according to FIG. 1 in a connecting position (rear view) turned through 90° on the same supporting column, FIG. 2 shows a section along line II—II in FIG. 1, FIG. 3 shows an elevation of the supporting device from below having two jibs on the same supporting column, with two jibs being attached such that they are displaced by 90° relative to one another, and FIGS. 4 and 5 each show a sectional representation similar to FIG. 2 for a round-tube and an oval-tube embodiment of the supporting device.

DESCRIPTION OF THE PREFERRED EMBODIMENTS

A jib-connecting device 2 engages in the form of a wedge mounting on a column 1 shown in the drawing as a square tube. The connecting device 2 essentially consists of a clamping chuck 3 which is approximately C-shaped in cross-section and grips arounds three of the four side surfaces of the square tube, and a tightening wedge 4 which is displaceable in the longitudinal direction of the column and is held within a channel-shaped tightening wedge cage 5 which tapers upward. The cage 5 is connected in one piece to the clamping chuck 3. The latter has a supporting wall 3.1 on the end face, on which a tubular jib arm 7 is attached over an integrally formed spigot 6. Connected to the supporting wall 3.1 is a (rear) clamping plate 3.2 which, together with the supporting wall 3.1 and a guide web 8 of 2 to 4 mm width bent inwards on this column, forms a retaining member of the connecting device 2, which retaining member is L-shaped in cross-section. The guide web 8, together with the clamping plate 3.2, forms a centering zone, by means of which the clamping chuck 3 is aligned with the column longitudinal axis.

The tightening wedge cage 5 connected opposite the supporting wall 3.1 to the clamping plate 3.2 defines a lateral opening 9 provided at the connecting device 2 and running in the longitudinal direction of the column, the longitudinal margins of which opening 9 are formed by the end edges of the cage 5 and the guide web 8. They run essentially parallel to one another and at a mutual distance which is about 3 to 5 mm wider than the width of the column section. This ensures that, when the tightening wedge 4 is pushed out slightly downward, the connecting device 2 can be placed on from the side over the column 1 and, after the tightening wedge 4 has been raised again, a load P can be applied to the jib arm 7.

The permissible load P, apart from depending on the dimensions of the column and jib, also substantially depends on the extend of the frictional engagement between the column 1 and the jib-connecting device 2. The relative friction force is applied solely by the tightening wedge 4. At a wedge angle of 8°–15°, a wedge length of about 6 cm and a column width of about 2 cm, loads P of up to 50 kg are realistic close to the column in the case of supporting devices for the display of ready-to-wear clothes. A plastic tightening wedge 4 of U-shaped cross-section and trough-shaped configuration (both longitudinal ends closed) and approximately 1.5 to 1.8 cm width is adequate for this purpose. To increase the initial frictional engagement, it is expedient to provide the wedge surface 10 facing the column 1 with an elastic lining 11. This is expediently a rubber strip which is embedded in an indentation (not shown) of the tightening wedge 4.

To retain the tightening wedge 4 in the cage 5 in a longitudinally displaceable manner in such a way that it cannot be lost, a rivet-shaped securing part 12 is provided the shank of which penetrates through a longitudinal slot 13 in the cage rear wall 5.1, which forms the base of the tightening wedge cage 5, and is anchored in a fixing boss 14 on the tightening wedge 4. The head of the rivet-shaped securing part 12 projects beyond the cage rear wall 5.1 and can be formed as a gripping element for the displacement of the tightening wedge 4.

FIG. 3 shows how the jib-connecting devices 2 provided with jib arms 7 can be attached in various positions with respect to the column cross-section. Of course, jib devices 2 can be attached at the same time in different vertical positions to all column longitudinal surfaces of a self-supporting column 1 which is accessible from all sides.

As shown in FIGS. 4 and 5, the supporting device can be used not only in conjunction with square columns. FIG. 4 shows a round-tube support column 21 in the same sectional position as FIG. 2. The job-connecting device 22 contains a clamping chuck 23, the end-face supporting wall 23.1 of which, together with the end portion which can be termed a guide web 28, continuously follows the column surface up to the diameter line (D) which is perpendicular to the longitudinal axis (La) of the jib arm 27. The tightening wedge 24 provided with an elastic lining 31 as in FIG. 2 sits in a tightening wedge cage 25 which can be curved with the same radius as the supporting wall 23.1 or can be integrally formed at right angles according to FIG. 2. The supporting wall 23.1 is connected to the tightening wedge cage 25 via a clamping plate 23.2. The lateral, continuous opening which is designated as 29 extends from the free end of the tightening wedge cage 25 up to the free end of the guide web 28 and—after the tightening wedge 24 has been pushed out—enables the jib-connecting device 22 to be put onto or removed from the support column 21. The sliding attachment 32 of the tightening wedge 24 and the wedge angle can be formed in the same way as shown in FIGS. 1 and 2.

The configuration of the supporting device with an oval tube as a support column 41 can be seen from FIG. 5. The jib-connecting device 42 contains a clamping chuck 43, the end-face supporting wall 43.1 of which essentially grips around the facing wide side of the oval section. The tightening wedge 44 provided with an elastic lining 51 as in FIG. 2 sits in a tightening wedge cage 45, the base contour of which can be curved essentially symmetrical to the supporting wall 43.1 or can be integrally formed at right angles according to FIG. 2. The supporting wall 43.1 is connected to the tightening wedge cage 45 via a clamping plate 43.2.

The lateral, continuous opening which is designated as 49 extends from the free end of the tightening wedge cage 45 up to the free end of the guide web 48. Its width is selected such that, after the tightening wedge 44 has been pushed out, the jib-connecting device 42 can be put onto or removed from the support column with adequate clearance. The sliding attachment 52 of the tightening wedge 44 and the wedge angle can be formed in the same way as shown in FIGS. 1 and 2.

I claim:

1. An adjustable supporting device for securing a jib to a support column, said supporting device comprising a jib connecting device having a clamping chuck with connecting means for connecting said jib to said clamping chuck and a tightening wedge to facilitate supporting engagement of said connecting device and said column;

said clamping chuck surrounding said column on three sides thereof for laterally placing said jib on said column and removing said jib therefrom, wherein said clamping chuck comprises:

a supporting wall, to which said jib is removably connected, extending over the width of a first side of said column, said supporting wall having a guide web which forms part of a centering means for said clamping chuck along said column;

a clamping plate connected to said supporting wall and extending over the width of a second side of said column adjacent to said first side of said column;

a U-shaped tightening wedge cage having a first side wall connected to said clamping plate and a second side wall which limits a passage opening in front of a fourth side portion of said column, which passage opening extends to said guide web on said supporting wall, wherein the opening of said U-shaped cage faces a third side of said column, opposite the first side of said column, for receiving said tightening wedge which is supported between said clamping chuck and a base of said cage, converging in the load direction of said jib.

2. Supporting device according to claim 1, wherein the clamping plate and the guide web run on both sides of the supporting wall parallel to the side portions adjacent to the first side of said column, and together form a centering zone which is placed against said column and aligns the clamping chuck with the longitudinal axis of the column.

3. Supporting device according to claim 1, wherein the tightening wedge has an essentially U-shaped cross-section, and wherein its surface facing said column has an elastic lining.

4. Supporting device according to claim 1, wherein the tightening wedge is secured in said tightening wedge cage in longitudinally displaceable manner.

* * * * *